Aug. 22, 1933.　　　V. G. APPLE　　　1,924,046
VEHICLE BRAKE
Filed Nov. 14, 1929　　3 Sheets-Sheet 2

INVENTOR
Vincent G. Apple
BY Burton & McConkey ATTORNEYS

Aug. 22, 1933.  V. G. APPLE  1,924,046
VEHICLE BRAKE
Filed Nov. 14, 1929  3 Sheets-Sheet 3
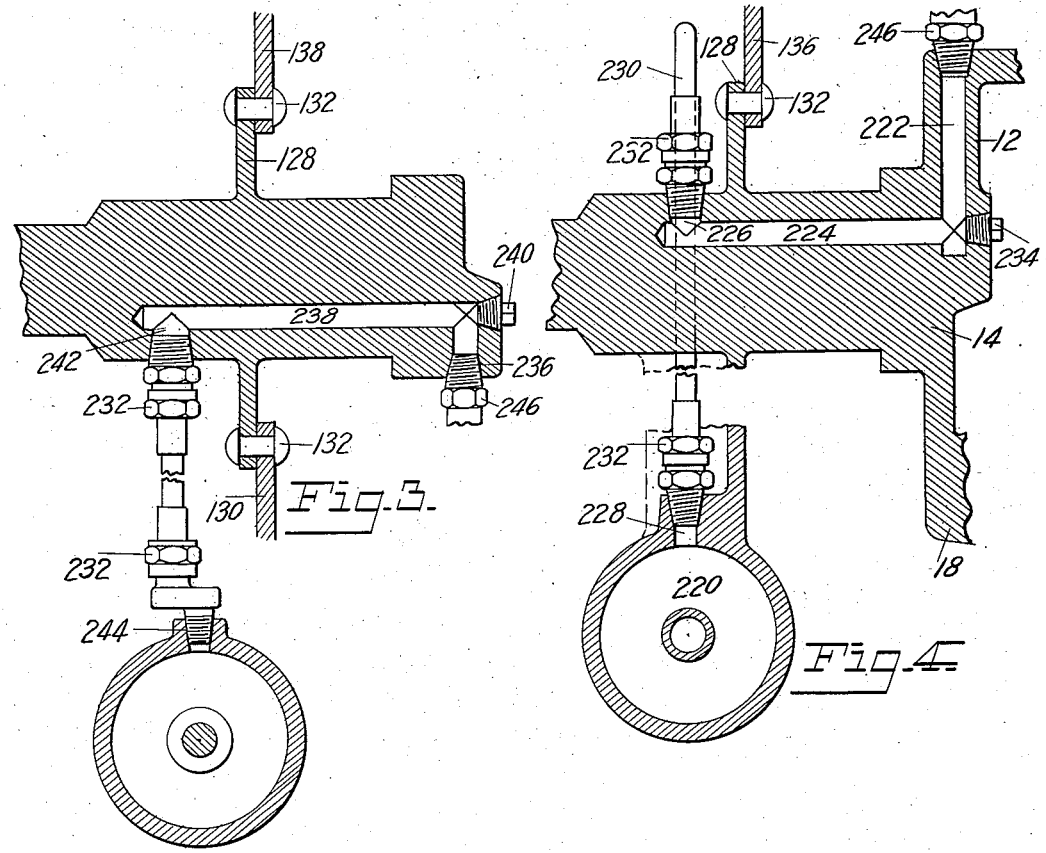
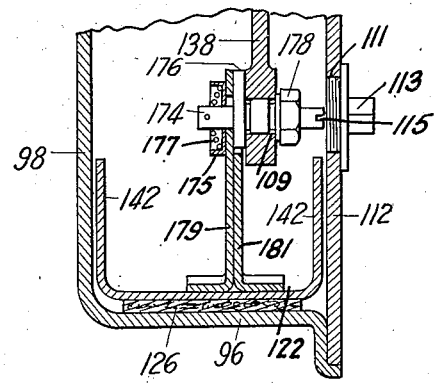
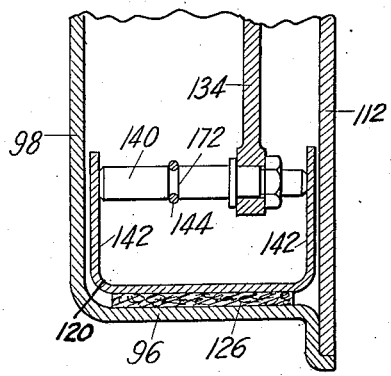
INVENTOR_
Vincent G. Apple
BY Burton & McConkey ATTORNEYS Patented Aug. 22, 1933

1,924,046

UNITED STATES PATENT OFFICE 1,924,046

VEHICLE BRAKE

Vincent G. Apple, Dayton, Ohio, assignor to Bendix Brake Company, South Bend, Ind., a Corporation of Illinois Application November 14, 1929
Serial No. 407,085

6 Claims. (Cl. 188—152)

My invention relates to improvements in brakes, and particularly to those adapted for use on automotive vehicles.

An object of this invention is to adapt a compact, dust and water proof power operated brake mechanism, the operating parts of which are completely encased within a rotatable brake drum as shown in detail in my copending application, (Serial No. 404,235, filed November 2, 1929,) for mounting on the front or steerable wheel of any non-rotatable axle.

Still another object is to arrange for the mounting of such a brake assembly on an ordinary steering spindle by slightly modifying the spindle to co-act with the power means of the brake mechansm.

A further object of my invention is to facilitate the adjustment of the spacing between the brake drum and brake lining of a brake assembly such as the one disclosed in my aforesaid copending application by providing means for that purpose on one of the arms of the brake shoe supporting members.

The foregoing and many other meritorious objects are attained in the mechanism herein described and illustrated in conjunction with the drawings, wherein:—

Figure 1:
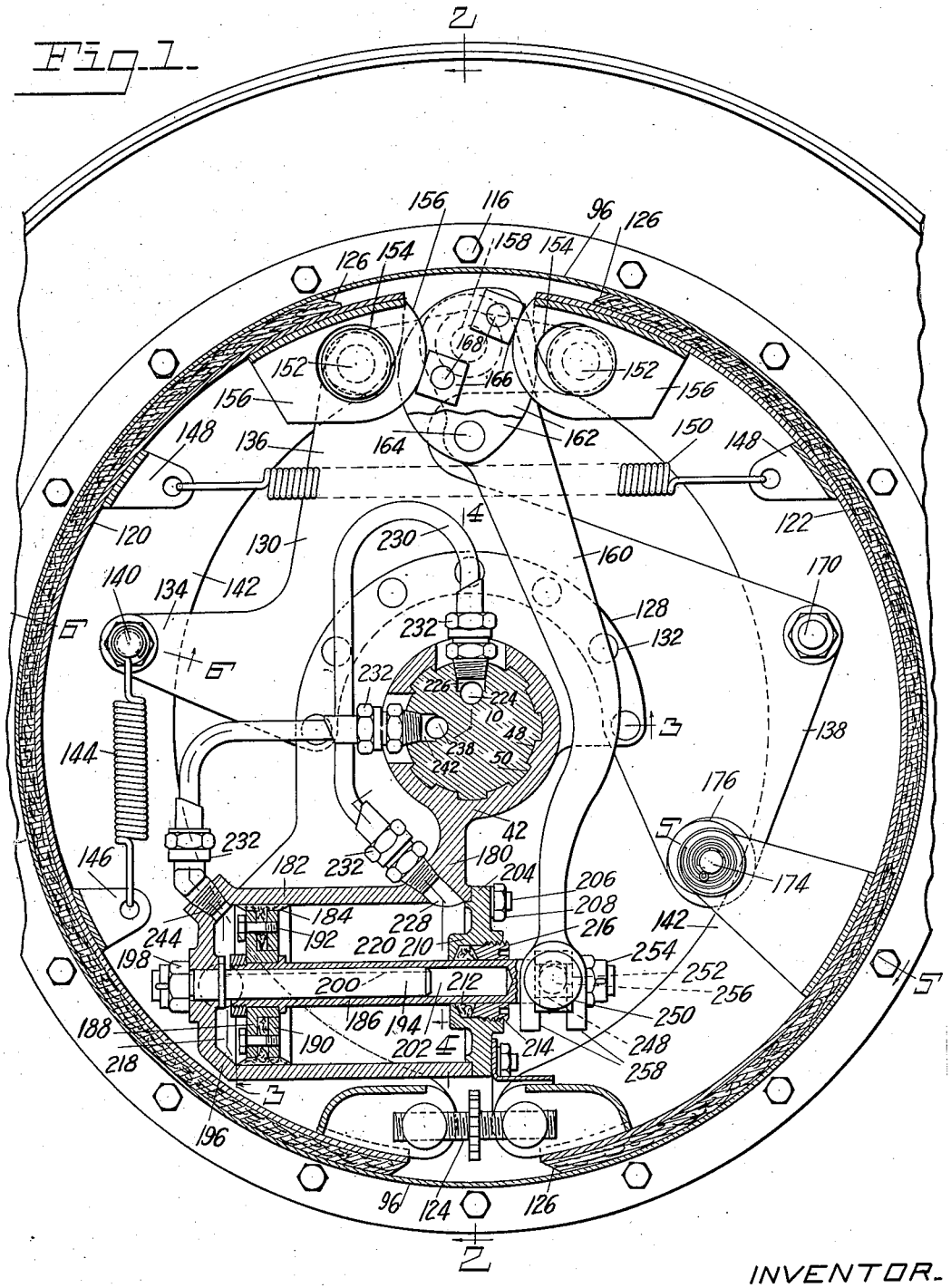
Fig. 1 is a transverse section taken on the line 1—1 of Fig. 2, through an automotive front wheel and steering spindle in which my improved braking mechanism is embodied.
Figure 2:
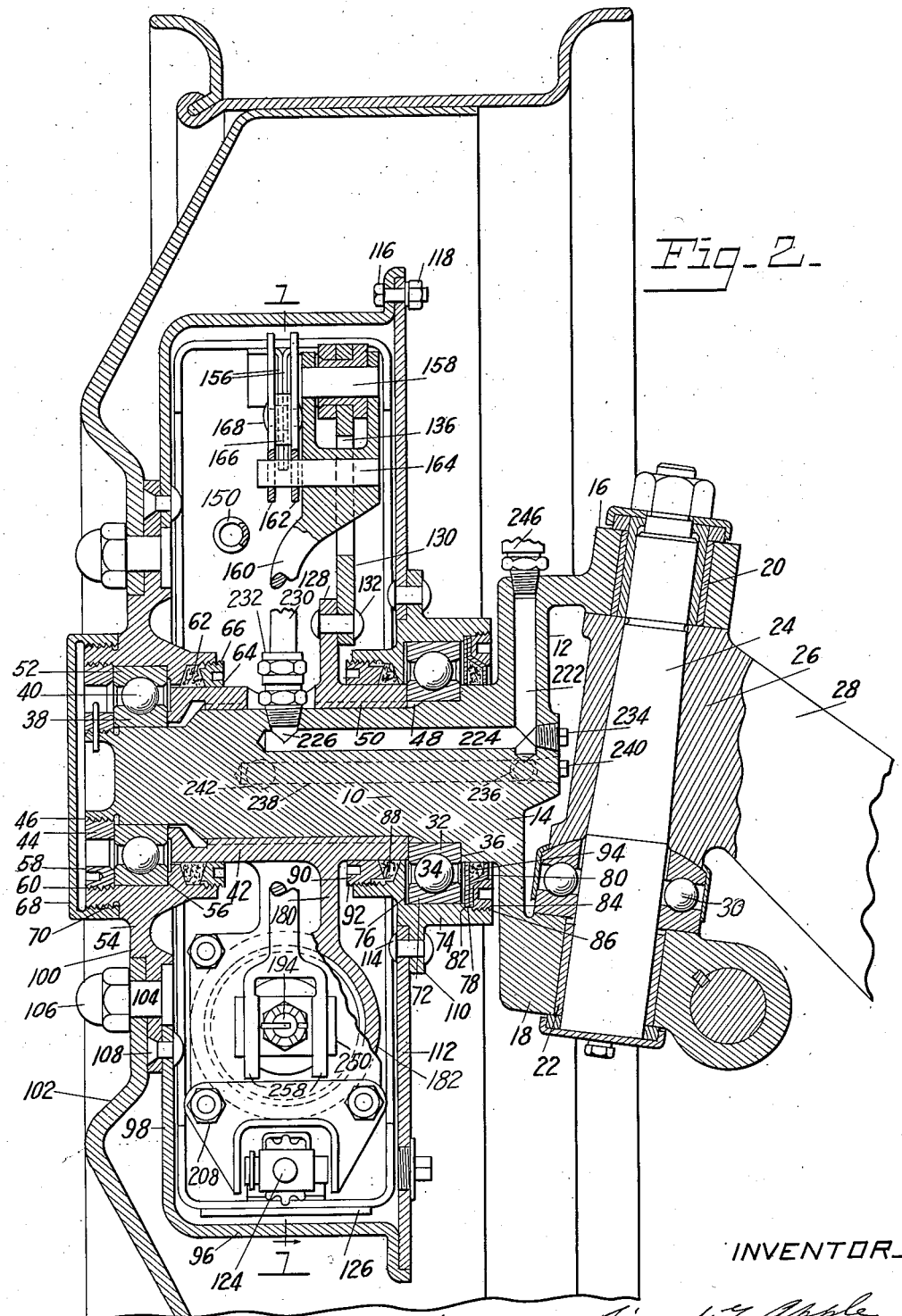
Fig. 2 is a vertical axial section taken on the line 2—2 of Fig. 1.

Figs. 3, 4, 5 and 6 are fragmentary sections taken on lines 3—3, 4—4, 5—5 and 6—6 respectively of Fig. 1.

Similar numerals refer to similar parts throughout the several views.

In the drawings the steering knuckle comprises the usual spindle 10 having radially extending arms 12 and 14 carrying hubs 16 and 18 for bushings 20 and 22. The steering pivot pin 24 is tightly secured in the hub 26 of axle 28 and rotatably in bushings 20 and 22, with the anti-friction thrust bearing 30 under hub 26 for taking the vertical steering load.

The inner race 32 of radial bearing 34 is fitted snugly to spindle 10 adjacent shoulder 36, and the outer race 38 of a somewhat smaller radial bearing 40 is similarly fitted to the outer end of the spindle. A hub 42 spaces the inner and outer races 32 and 38 apart and a nut 44 threaded on spindle 10 at 46 clamps the races and hub against the shoulder 36 thus restraining them against axial movement on the spindle. Spindle 10 has a series of integral keyways 48 which engage corresponding keyways 50 in hub 42, effectually preventing rotation of the hub on the spindle. (See Fig. 1.)

The outer race 52 of bearing 40 is snugly fitted to a bearing housing 54 and is held against shoulder 56 by a nut 58 threaded into the housing at 60. A packing ring 62 secured by nut 64 threaded into the housing at 66 holds the bearing lubricant in the housing. A hub cap 68 threaded into housing 54 at 70 closes it at the outer end.

The outer race 72 of the bearing 34 is snugly fitted at its outside diameter to the bearing housing 74 but has slight axial movement therein, limited in one direction by the shoulder 76 and in the other by the washer 78. The washer 78 together with the cupped washer 80 are held against shoulder 82 by nut 84 threaded into the housing 74 at 86. A packing ring 88 secured by nut 90 threaded into housing 74 at 92 keeps the bearing lubricant from escaping at the inner end, while another packing ring 94 held between washers 78 and 80 keeps the lubricant from escaping at the outer end. The ability of housing 74 to move axially over bearing 34 takes care of inequalities in relative axial expansion between hub 42 and the outer rim of brake drum 98.

Housing 54 has an outwardly extending flange 100 to which the disk wheel 102 is held by bolts 104 and nuts 106, and to which the rotatable brake drum 98 is secured by rivets 108, while housing 74 has the smaller flange 110 to which the brake drum cover 112 is secured by rivets 114. Bolts 116 and nuts 118 hold cover 112 to drum 98 thereby forming a tight compartment within the drum, which is sealed against water from without and oil from the bearings, making a highly desirable housing for the friction elements of a brake.

The non-rotatable friction means comprised two brake shoes 120 and 122 of channel shaped cross-section joined at the lower end by the right and left adjusting screw 124, rotation of which to force the lower ends of the shoes apart is resorted to only when the brake linings 126 are worn sufficiently to require adjustment. The upper ends of the shoes are forced apart whenever braking is to be effected. In order that power braking means of relatively small capacity may be employed, a cam mechanism operable by the power means supplemented by the wrap of the shoes is selected, and a lever having a relatively long power arm and correspondingly great movement at the power end is employed to operate the cam.

Ordinarily the non-rotatable members of a braking mechanism such as the shoes, the shoe operating cams and the means for holding the shoes out of engagement, are mounted on a non-rotatable plate called the backing plate, which to some extent closes the open side of the brake drum to form a housing about the braking mechanism. But since, in the present invention both sides of the drum revolve, mounting means in lieu of a backing plate is provided within the revolving drum.

The hub 42, which is secured against rotation on spindle 10 by multiple keys 48 and 50, has an outwardly extending flange 128 to which a plate 130 is secured by rivets 132. Plate 130 has the arms 134, 136 and 138 extending radially outward to support the several non-rotatable members of the brake against rotation.

Arm 134 carries the stud 140 (see Fig. 6) which has the two-fold purpose of keeping the webs 142 of shoe 120 from contact with the rotating elements and of holding one end of spring 144, the other end of the spring being connected to a bracket 146 welded to shoe 120. Similar brackets 148 are welded, one to each shoe, and the spring 150 connects the two brackets. The springs 144 and 150 hold the two shoes 120 and 122 so as to keep the linings 126 out of engagement with drum 98 when no braking action is desired.

Arm 136 carries the studs 152 which extend through holes 154 in brackets 156 which are welded to the ends of shoes 120 and 122 and form an abutment against which spring 150 may hold them when they are in the inoperative position. Arm 136 also carries the stud 158 upon which lever arm 160 fulcrums. Camming plates 162 fulcrum on stud 164 fixed in lever arm 160, and blocks 166 are rotatably supported on studs 168 riveted into the camming plates. Blocks 166 bear against the ends of brackets 156 and force the ends of the two shoes apart when braking action is desired.

Arm 138 carries the stud 170 which is similar to stud 140 except that it does not have the spring groove 172. Stud 170 functions like stud 140 in that it side spaces the shoe 122 to present contact of its sides with the rotating members.

Arm 138 is also provided with a snug bearing 109 for stud 174 (see Fig. 5). Two flanges are secured to the inner circumference of the shoe 122 and have arms 179 and 181, extending radially in between the shoe flanges 142. Arm 179 is provided with an aperture in alinement with the bearing 109 in arm 138, but arm 181, which extends up between arm 179 and the outer extremity of arm 138, is cut short to form a bearing surface for the cam element 176 on stud 174. The cam and stud are secured in place and means are provided for locking the cam in any desired position by use of a plate 175 slidably mounted on one end of stud 174 and urged inwardly thereon against the face of arm 179 by a spring 177 which is fixed to the outer end of the stud. The stud is threaded at the other end and lock nut 178 is screwed thereon to secure the cam in position. A groove 115 is cut transversely in the outer end of stud 174 whereby the stud with its cam 176 may be rotated after loosening lock nut 178. An opening 111 is provided in the drum cover 112, which is normally closed by screw threaded cap 113. It is obvious that the space between the brake drum 96 and shoe 122 may be adjusted by simply removing this cap and rotating the cam.

The rim 128 of hub 42 extends downwardly at 180 and carries the cylinder 182 which is of such diameter as to go between the two sides of shoe 120. This cylinder is bored to slidably receive the molded piston 184 which is concentrically supported on tubular piston rod 186 by metal hub 188 and washer 190 held together by screws 192. A stud 194 held in the end 196 of cylinder 182 by nut 198 furnishes a bearing over which tubular piston rod 186 may slide to keep it central with the cylinder bore, thus relieving the molded piston 184 of the downward pressure due to the weight of the piston rod. A groove 200 prevents the operating fluid being unduly compressed in the space 202.

The open end of the cylinder 182 is closed by the head 204 held in place by bolts 206 and nuts 208. Head 204 has a hub 210 bored to receive packing ring 212 and threaded at 214 for packing nut 216. The interior of the cylinder is thus divided into the two pressure tight compartments 218 and 220, and in order to carry the operating fluid from a source of supply outside the brake drum during rotation thereof to the two compartments 218 and 220 within the brake drum, special fluid carrying conduits are provided.

A vertically extending opening 222 is drilled through arm 12 to meet an axially extending drilled opening 224 in spindle 10. A tapped hole 226 extends radially outward from opening 224, and an angularly tapped hole 228 enters the cylinder at the front end. Piping 230 provided with connections 232 joins tapped holes 226 and 228. The outer end of hole 224 is plugged as at 234.

The other compartment 218 is similarly connected to the fluid pressure source through the radially drilled opening 236, the axially drilled opening 238 plugged at 240, and the tapped holes 242 and 244. Connectors 246 at the outer ends of radially drilled openings 222 and 236 are adapted to attach flexible fluid conveying hose coming from a fluid pressure supply whereby liquid under pressure or gas at sub or superatmosphere may be conveyed within the drum to operate the piston 184 in one direction to apply the brakes and in the other direction to release them.

The forward solid end of piston rod 186 is reduced in diameter as at 248. A stud 250 is flattened at 252 and has an opening through this flattened part at right angles to its axis and to fit over the reduced diameter 248 of the rod 186, where it is held secured by nut 254. Stud 250 is reduced in diameter at each end as at 256 and the two forked ends 258 of lever arm 160 fit over these reduced portions, whereby axial movement of the piston rod 186 in cylinder 182 operates lever arm 160 to operate the brake.

Since the fluid control means forms no part of this invention, none is shown, but it is preferred that a control be employed which normally connects both compartments 218 and 220 equally to the fluid source to maintain the brakes in statu quo, with means to bleed one or the other compartments to unbalance the forces thereon to apply or release the brakes as desired.

From a consideration of the description and drawings the reason for employing brake shoes of channel shaped cross-section will appear, for, to admit a fluid pressure power device of sufficient length and have room remaining for its endwise operation, the space between the webs 142 of the brake shoes must be utilized. This may readily be done with the channel shaped shoes but not so readily wherein a single web 142 is located in the middle of the rim of the shoe.

Further modifications will be obvious to those skilled in the art and it is my intention to be limited only within the scope of the appended claims.

I claim:

1. In an internal expanding brake assembly, a rotatable brake drum closed at both ends, expansible friction means secured against rotation within the drum, means for adjusting the radial spacing between the drum and friction means located adjacent the periphery of the drum, and means in one closed end of said drum providing access to the adjusting means.

2. In an internal expanding brake assembly, the structure defined in claim 1 wherein the adjusting means consists of cam mechanism.

3. Internal expanding brake mechanism including in combination a non-rotating hub member, radially expansible friction shoes of channel shaped cross section secured to the hub, an arm secured to one of said shoes between the channels thereof and extending radially inwardly, and a rotatable cam supported by said hub, its camming face in contact with the inner end of said inwardly extending arm.

4. Braking mechanism including in combination, a rotatable closed drum, a hub co-axial with said drum secured against rotation therein, arms extending radially outward from said hub, radially expansible friction shoes of channel shaped cross section secured to said arms, an arm secured to the inner face of one of the shoes and extending inwardly, a cam rotatably mounted in one of said outwardly extending arms and contacting the inner extremity of said inwardly extending arm, and means in one face of said drum providing access to said cam.

5. In a brake assembly including a closed rotatable brake drum and radially expansible friction shoes of channel shaped cross section secured against rotation within said drum, means for radially adjusting said shoes consisting of an arm secured to the inner circumference of a shoe and extending radially inwardly between the channels thereof, and a rotatable cam member secured against rotation within the drum and contacting the inner end of said inwardly extending arm.

6. In a brake assembly including radially expansible friction shoes of channel shaped cross section secured to a non-rotatable hub, means for radially adjusting said shoes consisting of an arm attached to the inner circumference of a shoe and extending radially inwardly, an arm on said hub, and a cam rotatably mounted in said arm and contacting the inner end of said inwardly extending arm.

VINCENT G. APPLE.